United States Patent
Felgate et al.

(10) Patent No.: US 9,350,638 B2
(45) Date of Patent: May 24, 2016

(54) ETHERNET PHYSICAL LAYER MONITORING SYSTEM EMPLOYING SOCIAL NETWORKING SERVICE FOR DELIVERY OF ALERTS TO MOBILE DEVICES

(75) Inventors: Arthur E. Felgate, Richfield, MN (US); Christopher Koch, Minneapolis, MN (US); Peter Monarski, St. Louis Park, MN (US); Jeff Blaiser, Hudson, WI (US)

(73) Assignee: Transition Networks, Inc., Minnetonka, MN (US)

( * ) Notice: Subject to any disclaimer, the term of this patent is extended or adjusted under 35 U.S.C. 154(b) by 0 days.

(21) Appl. No.: 14/241,312

(22) PCT Filed: Aug. 24, 2012

(86) PCT No.: PCT/US2012/052292
§ 371 (c)(1),
(2), (4) Date: Aug. 7, 2015

(87) PCT Pub. No.: WO2013/032913
PCT Pub. Date: Mar. 7, 2013

(65) Prior Publication Data
US 2015/0341252 A1      Nov. 26, 2015

Related U.S. Application Data

(60) Provisional application No. 61/527,953, filed on Aug. 26, 2011.

(51) Int. Cl.
*H04L 12/28* (2006.01)
*H04L 12/26* (2006.01)
(Continued)

(52) U.S. Cl.
CPC ............ *H04L 43/18* (2013.01); *H04B 10/0795* (2013.01); *H04L 51/24* (2013.01);
(Continued)

(58) Field of Classification Search
CPC ....................................................... H04L 12/56
USPC .................................. 370/389–589, 311–339
See application file for complete search history.

(56) References Cited

U.S. PATENT DOCUMENTS

| | | | |
|---|---|---|---|
| 7,940,676 B2 * | 5/2011 | Griffin | .................... H04L 43/50 370/242 |
| 2002/0118413 A1 | 8/2002 | Yamada et al. | |

(Continued)

OTHER PUBLICATIONS

International Search Report for PCT/US2012/052292, dated Jan. 14, 2013.
European Search Report dated Sep. 4, 2015, for corresponding European Application No. 12827295.2.

*Primary Examiner* — Iqbal Zaidi
(74) *Attorney, Agent, or Firm* — John D. Veldhuis-Kroeze; Westman, Champlin & Koehler, P.A.

(57) ABSTRACT

A communication network physical monitoring system and method employs a media converter device configured to transport communication/Ethernet data traffic and sense network physical layer conditions and/or events. An event controller device in communication with the media converter device receives transmissions indicating network physical layer conditions and/or events from the media converter device. The event controller is configured to transmit messages indicating the network physical layer conditions and/or events via a Social Media/Networking Service to devices that subscribe to receive messages from the event controller device on the Social Media/Networking Service.

17 Claims, 2 Drawing Sheets

(51) Int. Cl.
  *H04B 10/079* (2013.01)
  *H04Q 11/00* (2006.01)
  *H04L 29/06* (2006.01)
  *H04W 4/14* (2009.01)
  *H04W 4/20* (2009.01)
  *H04L 12/58* (2006.01)

(52) U.S. Cl.
  CPC ............... *H04L 51/32* (2013.01); *H04L 69/08* (2013.01); *H04Q 11/0005* (2013.01); *H04W 4/14* (2013.01); *H04W 4/206* (2013.01); *H04Q 2011/0052* (2013.01)

(56) References Cited

U.S. PATENT DOCUMENTS

| | | |
|---|---|---|
| 2003/0021281 A1 | 1/2003 | Tanaka et al. |
| 2007/0058666 A1 | 3/2007 | Pratt |
| 2008/0291855 A1* | 11/2008 | Bata .............. H04W 84/18 370/311 |
| 2010/0036939 A1* | 2/2010 | Yang ............. H04L 12/2697 709/224 |
| 2010/0211664 A1 | 8/2010 | Raza et al. |
| 2010/0262467 A1 | 10/2010 | Barnhill, Jr. et al. |
| 2011/0035452 A1 | 2/2011 | Gittleman |

* cited by examiner

ETHERNET PHYSICAL LAYER MONITORING SYSTEM EMPLOYING SOCIAL NETWORKING SERVICE FOR DELIVERY OF ALERTS TO MOBILE DEVICES

BACKGROUND

The present invention is related to the technical field of computer networking. More particularly, the present invention is related to the technical field of Ethernet media conversion.

A media converter is a device employed in a network communication system to communicatively connect one type of media to another, for example, to connect copper Ethernet media to fiber optic media. The prior art in this field includes unmanaged media converters which provide no information to a user, and fully-managed devices which require network access via an IP address or equivalent and/or configuration by a user or management system.

SUMMARY

The present invention is a communication network physical monitoring system and method that employs a media converter device configured to transport communication/Ethernet data traffic and sense network physical layer conditions and/or events. An event controller device in communication with the media converter device receives transmissions indicating network physical layer conditions and/or events from the media converter device. The event controller is configured to transmit messages indicating the network physical layer conditions and/or events via a Social Media/Networking Service to devices that subscribe to receive messages from the event controller device on the Social Media/Networking Service.

DETAILED DESCRIPTION

Disclosed herein is an Ethernet physical and media access control (MAC) layer monitoring system embedded in a Smart Media Converter's hardware and software, which transmits status or predefined alerts directly to a social networking site for distribution of status or event messages in a cost effective manner and also eliminates the need for a user to manage or configure physical layer media converters or switches to obtain status or alert information. This system is superior to existing methods since it does not require configuration of the Ethernet device, also known as the Smart Media Converter, and can leverage the publicly available social networking communications infrastructure, as compared to current proprietary methods that are not commonly available and are not cost effective.

Social Media/Networking Services encompass many components that heretofore were required by the customer/operator to be owned and operated by the customer. The system disclosed herein, employing Social Media/Networking Services, provides an advantage to the customer over prior art systems using e-mail and/or paging systems. Social Media/Networking Systems can offer security and broadcast services, and can maintain file systems and servers that are not part of the customer's ownership space. This allows the customer to have a greater set of features at a vastly lower cost than what is currently available.

Figure 1:
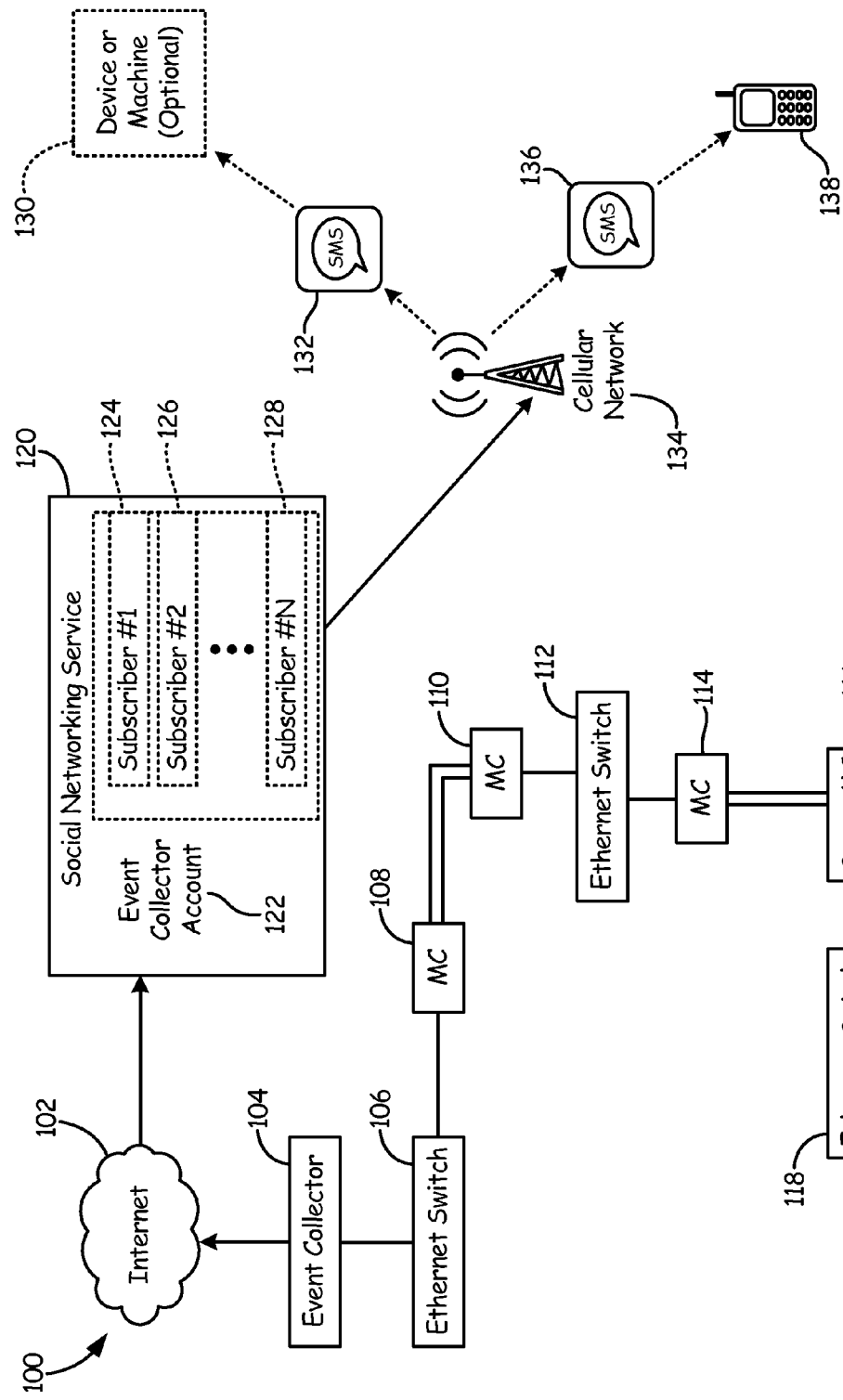
FIG. 1 is a block diagram of a network communication system employing a Smart Media Converter capable of communicating via a Social Media/Networking Service according to an embodiment of the present invention.

FIG. 1 is a block diagram illustrating network communication system 100, showing Internet 102 connected to an Ethernet local area network (LAN), via Event Collector 104. Event Collector 104 is connected to Ethernet Switch 106, which in turn is connected via copper Ethernet cable to Media Converter 108. Media Converter 108 is connected via fiber optic cable to Media Converter 110, which in turn is connected to Ethernet Switch 112 via copper Ethernet cable. Ethernet Switch 112 is connected to Media Converter 114 via copper Ethernet cable, and Media Converter 114 is connected via fiber optic cable to Smart Media Converter 116, which is in turn connected via copper Ethernet cable to Ethernet Switch 118. Thus, the Ethernet LAN is made up of Ethernet switches and media converters, including a Smart Media Converter 116, that together with Event Collector 104 is capable of generating and transmitting, via the Internet 102 or an equivalent network, Ethernet physical layer status alerts. The configuration of the Ethernet LAN shown in FIG. 1 is just an example of one possible configuration, and it will be understood by those of ordinary skill in the art that many different configurations of Ethernet LANs are possible and are contemplated by the present invention.

Smart Media Converter (MC) 116 is an unmanaged device which avoids the need for an Internet Protocol (IP) stack and associated resources necessary to support an IP stack. Instead, Smart Media Converter 116 generates and transmits layer-2 (from the ISO 7-layer networking model) Ethernet frames from one or more ports in the direction of Ethernet Switch 118 and/or Media Converter 114, distinguished from all other Ethernet frames within the LAN by a unique reserved EtherType field and 802.3 Destination MAC Address.

An Ethernet frame with a unique Ether Type field will be forwarded from the Smart Media Converter 116 to the Event Collector 104 by all interposing IEEE 802.3 Ethernet standard-compliant switches and media converters, regardless of vendor. The Event Collector 104 is programmed to recognize the unique Ether Type field inserted by the Smart Media Converter 116 and process this type of Ethernet frame. Thus, by using a unique Ether Type field, the Smart Media Converter 116 is able to communicate information in-band over the Ethernet LAN to the Event Collector 104, without the use of an IP stack or TCP/IP or UDP/IP protocols, as all communications are done at layer-2, avoiding expensive managed Ethernet devices.

Event Collector 104 transmits alerts to Social Media/Networking Service 120 via the Internet 102. Social Media/Networking Service 120 may be any of a number of individual peers, with relationships between the peers established to enable communications between them; popular, mature services of this type include Facebook, Twitter, and others. The connection from the Event Collector 104 to the Internet 102 may be a wired or wireless connection. In the case of a wireless connection (utilizing any of a number of standard communication protocols), these events may be communicated by the Event Collector 104 via an SMS message addressed to a fixed address associated with a Social Media/Networking Service such as Twitter (e.g. 40404 in North America) or Facebook. When the message is received by the Social Media/Networking Service 120 it will look up the Event Collector Account 122 associated with the Event Collector 104, and store the message in the Event Collector Account 122. This completes the publication of the Ethernet physical layer event to the Social Media/Networking Service 120.

Optional Subscribers 124, 126 . . . 128 may be 'following' Event Collector Account 122. If so, the Social Media/Networking Service 120 will update their accounts with the information published to the Event Collector Account 122. Any of the Subscriber 124, 126 . . . 128 accounts which have configured mobile alert notifications for social networking updates from Event Collector Account 122 will be forwarded a mobile alert, typically an SMS (Short Message Service) text message 132 or 136, via the Cellular Network 134, to their mobile device 138. Thus, Ethernet physical layer alerts detected by Smart Media Converter 116, communicated in-band to an Event Collector 104, transmitted via the Internet 102, to a Social Media/Networking Service 120, are propagated to a subscriber's mobile device 138, or even optionally to a Device or Machine 130.

Figure 2:
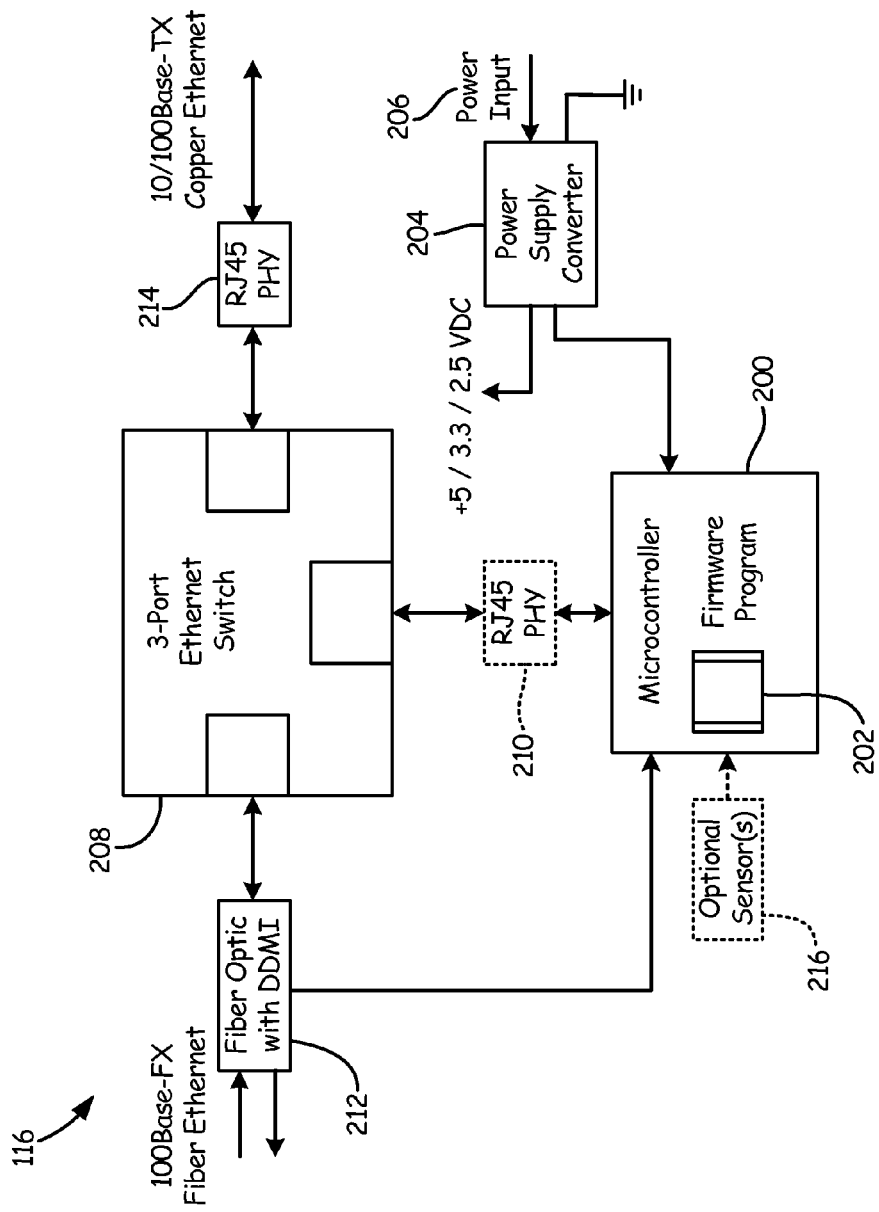
FIG. 2 is a block diagram of the Smart Media Converter component of the present invention.

FIG. 2 is a block diagram illustrating Smart Media Converter 116 in more detail. Microcontroller 200 with embedded Firmware Program 202 is powered via Power Supply Converter 204, connected to an external Power Input 206. The Microcontroller 200 is connected to a 3-Port Ethernet Switch 208 via a digital interface such as SPI (Serial Peripheral Interface), I2C (Inter-Integrated Circuit) or an Ethernet interface, in which case RJ45 physical connector 210 may be included. The 3-Port Ethernet Switch 208 is connected via a first port to a Fiber Optic with DDMI (Direct Digital Monitoring Interface) 212, and via a second port to an RJ45 physical connector 214. The Fiber Optic with DDMI 212 component is connected to 100Base-FX single-mode or multi-mode fiber; and the RJ45 physical connector 214 is connected to 10/100Base-TX copper Ethernet. Although the present invention is embodied with 10/100 copper and 100Base-FX fiber Ethernet, higher speed 10/100/1000 copper and 1000Base-X fiber (or other communication media supporting other standards) can be accommodated with the appropriate component substitutions.

Microcontroller 200 executes the system's application from instructions within the embedded Firmware Program 202 and periodically samples the status of the Fiber Optic with DDMI 212 optic parameters including transmitted laser or LED power, received laser or LED power, optics transmitter bias current, supply voltage and temperature. The state (and the change of state) of these optic parameters can indicate a deterioration of the Ethernet physical layer. For example, bias current may increase with aging of the laser optic, high temperature could indicate the connection may be at risk of imminent failure, and a sudden decrease in the received optic signal strength could indicate a compromised fiber optic cable. Optional Sensor(s) 216 such as a contact closure, humidity sensor, or temperature sensor may also be sampled periodically. Predetermined changes in any of these measured parameters, or the elapse of a predefined time period, may cause Microcontroller 200 to compose and transmit an Ethernet frame with the event type or sampled data included in the data portion of the Ethernet frame, and the Ethernet frame distinguished by a unique EtherType field and IEEE 802.3 Destination MAC address. One example of a unique EtherType field is 0x889F, used to indicate equipment manufactured by Transition Networks. One example of an IEEE 802.3 Destination MAC address, may be in the multi-cast range of 01-80-C2-00-00-10 through 01-80-C2-00-00-2F. Microcontroller 200 transmits the Ethernet frame in-band via the 100Base-FX Fiber Ethernet link and/or the 10/100Base-TX Copper Ethernet link, by injecting the frame into the 3-Port Ethernet Switch 208 via an interface which may include an RJ45 PHY physical connector 210.

In an exemplary embodiment, microcontroller 200 has an 8-bit word length and at least enough kilobytes of program ROM space and RAM memory onboard sufficient to store and execute the operating program and data structures for the monitoring application. In particular, Microcontroller 200 should have sufficient RAM memory buffer space to store an Ethernet frame of sufficient size to carry the largest data payload necessary to communicate a summary update of current measured environmental conditions or environmental events detected by Microcontroller 200 executing embedded Firmware Program 202. Microcontroller 200 also has onboard resources such as timers, A/D converter, serial and I/O ports sufficient for interfacing to the rest of the system electronics and supporting the program application. Persons possessing ordinary skill in the art of developing embedded systems will be familiar with the many different choices of low-cost, off-the-shelf, readily available 8-bit microcontrollers that can be used to implement this design. They will also be able to accurately estimate the program size necessary to implement the functions of this invention as described herein. The embedded Firmware Program 202 would typically be written in C and assembly language.

The Power Supply Converter 204 converts the Power Input 206 into the necessary voltages, such as +5V, +3.3V, or +2.5V necessary to power all the electronics in Smart Media Converter 116.

Smart Media Converter 116 also meets all required FCC and cellular carrier approvals and certifications.

The advantages of the present invention include, without limitation, the ability for a plurality of interested parties, including other devices, to simultaneously receive network physical layer wireless alerts on their mobile devices via a Social Media/Networking Service. Direct communication from the Event Collector 104 (FIG. 1) to the fixed address associated with a Social Media/Networking Service via commonly supported SMS messages, in the case of wireless transmission, or public APIs, in the case of wired transmission, eliminates the need to configure alert notification addresses into the Event Collector 104. Propagation of the alert message from the Social Media/Networking Service to subscribers such as Subscribers 124, 126 and 128 (FIG. 1) allows low cost notification when Event Collector 104 uses wireless transmission, since Event Collector 104 only incurs the charge to transmit a single wireless alert to the Social Media/Networking Service; and all subscribers can then be forwarded the alarm message from the Social Media/Networking Service. In the case in which a subscriber is a Device or Machine 130, this technique allows autonomous telemetry. For example, Smart Media Converter 116 could sense a network physical layer changing state and communicate that event to the Event Collector 104, and the Event Collector 104 could then transmit this event to the Social Media/Networking Service 120, and the Device or Machine 130 subscriber could then act upon that information.

A general aspect of the present invention is any type of unmanaged Ethernet device which senses network physical layer events or conditions, and transmits them in-band to an Event Collector device, which then alerts a plurality of interested parties, including other devices, of environmental conditions by leveraging the social network to which they subscribe, avoiding the need for configuration of subscriber address information. One key scenario of a physical layer media converter device is known as link pass-though (a.k.a LPT). In LPT, if one physical interface loses connectivity, the media converter drops the transmit signal on the opposite interface. This loss of transmission signals to another device that a link on the other side of the media converter is down. However, in the case of the Smart Media Converter, the opposite link transmits the Smart Media Converter status and/or events in the direction of the Event Collector. To allow the Event Collector to obtain the information from the Smart Media Converter, the Smart Media Converter waits to bring down the opposite link, until a period of time has elapsed that allows for the transmission of several event frames. After the Smart Media Converter sends these messages, it then brings down the opposite link. This allows interoperability with existing LPT deployments, and allows the Smart Media Converter to send information and status before the opposite link is brought down to indicate a fault. In one embodiment, an Auto-Negotiation feature could be used to keep the link down, but still convey some status information.

Although the present invention has been described with reference to preferred embodiments, workers skilled in the art will recognize that changes may be made in form and detail without departing from the spirit and scope of the invention.

The invention claimed is:

1. A communication network physical layer monitoring system comprising: a media converter device configured to transport communication/Ethernet data traffic and sense network physical layer conditions and/or events; an event collector device in communication with the media converter device to receive transmissions indicating network physical layer conditions and/or events from the media converter device, the event collector being configured to transmit messages indicating the network physical layer conditions and/or events via a Social Media/Networking Service to devices that subscribe to receive messages from the event collector device on the Social Media/Networking Service, wherein the media converter device is a Smart Media Converter device connected in an Ethernet local area network (LAN) made up of Ethernet switches and other media converter devices, and wherein the media converter device generates and transmits layer-2 Ethernet frames distinguished from other Ethernet frames in the Ethernet LAN by a unique reserved field and destination media access control (MAC) address.

2. The communication network physical layer monitoring system of claim 1, wherein the media converter device is connected between one of the other media converter devices and an Ethernet switch in the Ethernet LAN.

3. The communication network physical layer monitoring system of claim 2, wherein the media converter device is connected to the one of the other media converter devices via fiber optic cable, and is connected to the Ethernet switch via copper Ethernet cable.

4. The communication network physical layer monitoring system of claim 1, wherein the media converter device generates and transmits the layer-2 (from the ISO 7-layer networking model) Ethernet frames that are forwarded to the event collector device by the Ethernet switches and other media converter devices in the Ethernet LAN.

5. The communication network physical layer monitoring system of claim 1, wherein the messages transmitted by the event collector transmits via the Social Media/Networking Service are short message service (SMS) messages addressed to a fixed address associated with the Social Media/Networking Service.

6. The communication network physical layer monitoring system of claim 1, wherein the media converter device comprises: a microcontroller; a multi-port switch connected to the microcontroller via a digital interface; a fiber optic digital monitoring interface connected to a first port of the multi-port switch; and a physical connector connected to a second port of the multi-port switch.

7. The communication network physical layer monitoring system of claim 6, wherein the physical connector is an RJ45 connector.

8. The communication network physical layer monitoring system of claim 6, wherein the multi-port switch is connected to the microcontroller via a serial peripheral interface (SPI), an inter-integrated circuit (I2C) interface, or an Ethernet interface using an RJ45 physical connector.

9. The communication network physical layer monitoring system of claim 6, wherein the microcontroller periodically samples a status of optic parameters of the fiber optic digital monitoring interface, and generates and transmits an event message upon detecting a predetermined change in the status.

10. The communication network physical layer monitoring system of claim 9, wherein the optic parameters comprise one or more parameters selected from the group consisting of transmitted laser or LED power, received laser or LED power, optics transmitted bias current, supply voltage, and temperature.

11. The communication network physical layer monitoring system of claim 9, wherein the event message indicates an event type.

12. The communication network physical layer monitoring system of claim 9, wherein the event message includes data representing the sampled optic parameters.

13. The communication network physical layer monitoring system of claim 6, further comprising at least one sensor operatively coupled to the microcontroller, wherein the microcontroller periodically samples conditions sensed by the at least one sensor, and generates and transmits an event message upon detecting a predetermined change in the sensed conditions.

14. The communication network physical layer monitoring system of claim 13, wherein the at least one sensor comprises one or more sensors selected from the group consisting of a contact closure sensor, a humidity sensor and a temperature sensor.

15. The communication network physical layer monitoring system of claim 6, wherein the microcontroller periodically samples a status of optic parameters of the fiber optic digital monitoring interface and/or of conditions sensed by a sensor operatively coupled to the microcontroller, and periodically generates and transmits a network status message indicating the sampled status and/or conditions.

16. A method of monitoring physical layer conditions of a communication network, the method comprising: sensing network physical layer conditions and/or changes of physical layer conditions; and transmitting messages indicating a status of the network physical layer conditions via a Social Media/Networking Service to devices that subscribe to receive messages related to monitoring of the physical layer conditions of the communication network on the Social Media/Networking Service, wherein transmitting messages indicating a status of the network physical layer conditions comprises: generating and transmitting layer-2 Ethernet frames that indicate the status of the network physical layer conditions; forwarding the layer-2 Ethernet frames to an event collector device that is communicatively coupled to the Social Media/Networking Service; and transmitting the messages indicating the status of the network physical layer conditions from the event collector device to the Social Media/Networking Service.

17. The method of claim 16, wherein sensing network physical layer conditions and/or changes of physical layer conditions comprises: periodically sampling, with a microcontroller, a status of optic parameters of the network and/or of conditions sensed by a sensor operatively coupled to the microcontroller; and generating and transmitting a network status message indicating the sampled status and/or conditions upon detection of a predetermined change in the status of the sampled optic parameters and/or sensed conditions, or upon elapsing of a predetermined time period.

* * * * *